United States Patent [19]
Fujieda et al.

[11] 3,902,831
[45] Sept. 2, 1975

[54] DEVICE FOR REMOVING A CURED TIRE FROM A CURING MOLD

[75] Inventors: Yasuhiko Fujieda, Nishinomiya; Mitsuo Hashimoto; Nobuo Kawakami, both of Tokyo; Kazuhiko Nakagawa, Kobe, all of Japan

[73] Assignees: Bridgestone Tire Company Limited, Tokyo; Kobe Steel Ltd., Kobe, both of Japan

[22] Filed: Oct. 24, 1974

[21] Appl. No.: 517,612

Related U.S. Application Data
[63] Continuation of Ser. No. 399,421, Sept. 21, 1973, abandoned, which is a continuation of Ser. No. 192,273, Oct. 26, 1971, abandoned.

[30] Foreign Application Priority Data
Oct. 26, 1971  Japan............................... 46-94976

[52] U.S. Cl. .................................................. 425/38
[51] Int. Cl............................ B29h 5/02; B29h 5/08
[58] Field of Search ............................ 425/28 R, 38

[56] References Cited
UNITED STATES PATENTS

| | | |
|---|---|---|
| 3,260,782 | 7/1966 | Soderquist........................ 425/38 X |
| 3,343,208 | 9/1967 | Pacciarini et al...................... 425/38 |
| 3,378,882 | 4/1968 | Turk et al............................. 425/38 |
| 3,584,335 | 6/1971 | Ulm et al............................. 425/38 |

Primary Examiner—J. Howard Flint, Jr.
Attorney, Agent, or Firm—Oblon, Fisher, Spivak, McClelland & Maier

[57] ABSTRACT

A device for removing a cured tire from a mold in which the tire has been cured, comprising a columnar actuator having an armature movable along the axis thereof, and latching means carried by the armature and adapted to be selectively engaged with a bead ring secured to the tire contained in the mold, wherein the columnar actuator is mounted in a curing equipment in a manner that the axis thereof is substantially in alignment with the axis of the mold positioned at the center of a stand of the curing equipment, whereby the bead ring is forcibly displaced with reference to upper and lower mold halves of the mold to apply severing force between the tire and the upper and lower mold halves.

6 Claims, 4 Drawing Figures

DEVICE FOR REMOVING A CURED TIRE FROM A CURING MOLD

This is a continuation, of application Ser. No. 399,421 filed Sept. 21, 1973 and now abandoned, which is a continuation of Ser. No. 192,273 filed Oct. 26, 1971 now abandoned.

BACKGROUND OF THE INVENTION

1. Field Of The Invention:

This invention relates generally to equipment for curing tires, and more particularly to a device for removing a cured tire from a mold in which the tire has been cured.

2. Description Of The Prior Art

In curing medium or small-sized tires generally used for cars, trucks or buses as well as large-sized tires especially used for construction machines, super-heavy trucks or other special vehicles, a "green" tire, or one which is semi-shaped and conventionally formed in a semi-shaping unit to have a shape substantially corresponding to the final shape but is not yet cured, is placed in a mold unit composed of upper and lower mold halves, and the mold unit containing the semi-shaped tire is then charged into a conventional pot heater, or into a mechanical press such as disclosed in co-pending Patent application Ser. No. 192,275 filed by the inventors herein on Oct. 26, 1971 and now abandoned, and entitled "A Method and Apparatus for Curing Tires, Especialy Large-Sized Tires," where it is heated for curing the tire in a steam atmosphere under the application of a clamping force which holds the mold halves in closed condition against a very large expansion force being exerted in the curing process by the tire-forming materials contained in the mold. In the curing process, which extends from a few hours to as long as between 6 and 12 hours in the case of large-sized tires, the inner surface of the tire is supported by a bladder in which is introduced hot water under pressure. After the curing process, the mold unit is taken out of the pot heater or the mechanical press, as the case may be, and the cured tire is removed from the upper and lower mold halves.

However, since the tire is pressed against the inside surface of the mold by a very large force during the curing process, as described above, the outside surface of the cured tire is firmly binding to the inside surface of the mold, and therefore, a heavy, difficult and expensive procedure has heretofore been required to remove tires from the molds generally by using manually operated tools, especially in the case of large-sized tires.

SUMMARY OF THE INVENTION

Accordingly, it is a primary object of this invention to provide a device for removing a cured tire from a mold in which the tire has been cured which does not require, heavy, difficult and expensive manual work.

Another object of this invention is to provide such a device for removing a cured tire from a mold in which the tire has been cured that is adapted to be incorporated in a conventional pot heater or preferably in the mechanical press disclosed in co-pending Patent application Ser. No. 192,275.

The foregoing and other objects are attained, according to this invention, by a device for removing a cured tire from a mold in which the tire has been cured comprising a columnar actuator having an armature movable along the axis thereof and latching means carried by the armature being selectively engageable with a bead ring mounted to the tire contained in the mold, wherein the columnar actuator is mounted in a curing equipment in such a manner that the axis of the columnar actuator is substantially aligned with the axis of the mold positioned at the center of a stand of the curing equipment.

The columnar actuator may be a pneumatic, hydraulic, mechanical or electromagnetic type, and may preferably be operated by a remote control system.

The latching means preferably includes two or more key members adapted to be movable in radial directions with respect to the axis of the columnar actuator so that they may be engaged with or disengaged from cooperating notches provided in the bead ring secured to the tire contained in the mold. The latching means may also be actuated by any of a pneumatic, hydraulic, mechanical or electromagnetic power devices, and also is preferably operated by a remote control system.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein.

DESCRIPTION OF A PREFERRED EMBODIMENT

Figure 1:
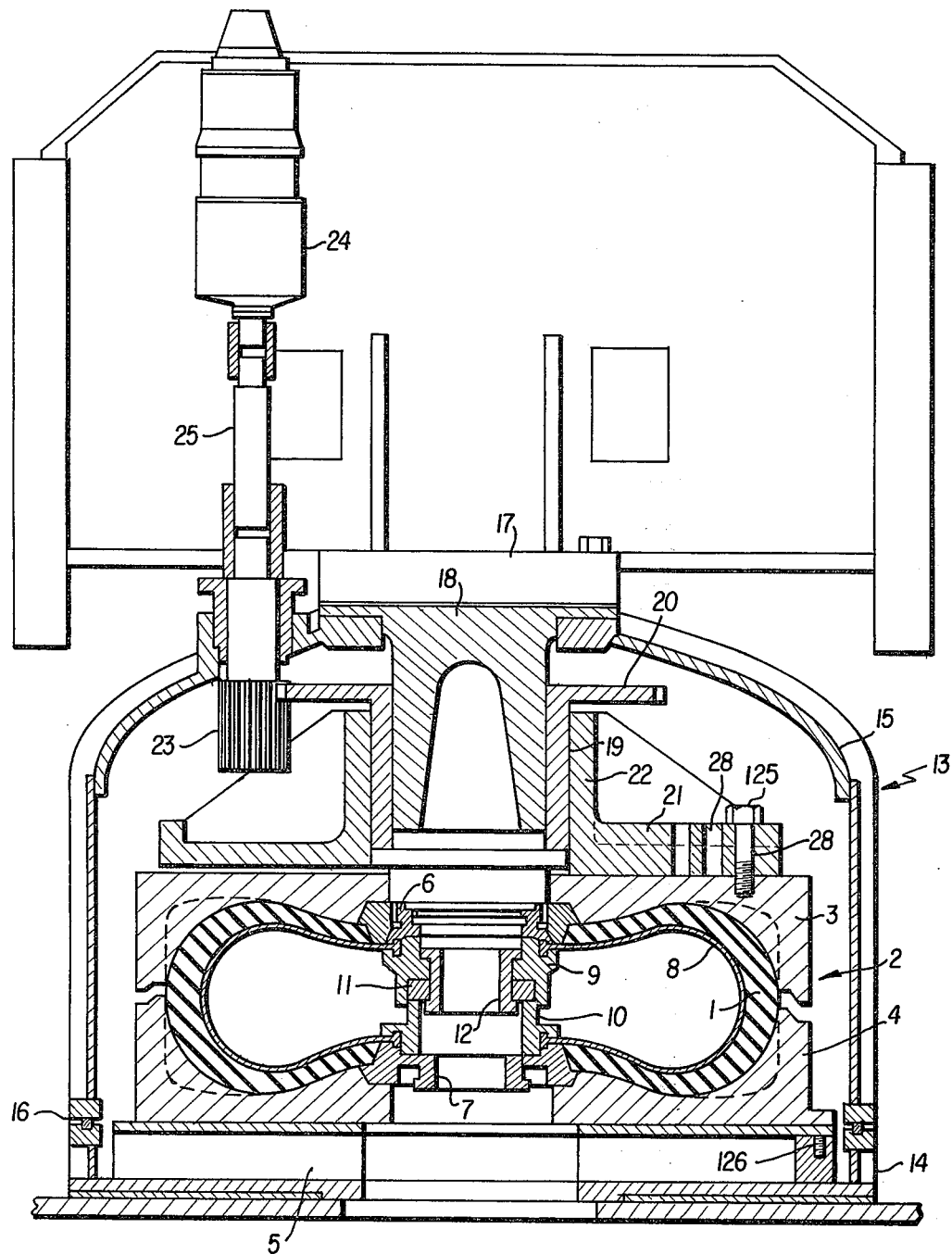
FIG. 1 is a vertical section of a mechanical press formed according to co-pending Patent application Ser. No. 192,275 in which the device according to this invention is to be incorporated for the purpose of explanation of this invention.

Referring now to the drawings, and particularly to FIG. 1, a semi-shaped and not yet cured, or a "green" tire 1, which has been produced in a conventional semi-shaping unit, not shown, is placed in a mold unit 2 composed of upper and lower mold halves 3 and 4, and the mold unit 2 is placed upon a stand 5 of a mechanical press. Before the tire 1 is placed in the mold, the bead portions of the tire are confined by upper and lower bead rings 6 and 7, and over the inside surface of the tire there is placed in contact therewith a bladder 8, the inside peripheries of which are fluid-tightly closed by cylindrical packing means composed of mutually engaged bladder rings 9 and 10, which in turn are engaged with the upper and lower bead rings 6 and 7. The bladder rings 9 and 10 are fluid-tightly engaged with each other via a packing ring 11, and are assembled by a locking element 12.

The mold unit 2 is placed on the stand 5 of the press and is covered by a housing 13 which provides a steam box in which the mold unit is subject to a steam heating atmosphere during the curing process of the tire. The housing 13 includes a lower housing member 14 mounted on the stand 5 and a bell-shaped upper housing member 15, both being adapted to join fluid-tightly with each other at the peripheral portions thereof, with a packing ring 16 being interposed therebetween. The upper housing member 15 is supported by a plunger body 17, which in turn is movably supported by a crank gear, not shown.

The plunger body 17 carries a first plunger element 18 formed as a columnar member being externally threaded. A second element 19 formed as a tubular member having threaded inner and outer surfaces is carried by the plunger element 18, with the first and second plunger elements 18 and 19 being in engagement with each other through the cooperating threads. A flanged portion 20 formed as a gear wheel which is adapted to be driven by a pinion as described hereinbelow is provided on the second element 19. A third plunger element 21 is also carried by the plunger element 19, having a flanged lower surface to contact the upper surface of the mold and a tubular upper portion 22 which is threaded on its inside surface to engage with the outside thread of the second plunger element 19. The threads on the inside and outside surfaces of the element 19 are spiralled in opposite directions so that rotation of the element 19 causes axial displacement of the third element 21 relative to the first element 18, provided that rotation of the third element 21 is prevented by a suitable axial guide means, not shown.

The gear wheel 20 is in meshing engagement with a relatively elonglated pinion 23 rotatably carried by the plunger body 17 and adapted to be driven by a geared motor 24 via coupling means 25.

The plunger body 17 is carried by a crank gear, not shown, and is moved up or down to respectively open the bell-shaped upper housing member 15 and reveal the space over the stand 5 for charging or discharging the mold 2 into or out of the press, or to close the housing 13 to confine a steam atmosphere for heating the mold charged therein. In relation with the operation of the crank gear, the geared motor 24 may be operated to drive the pinion 23 and second plunger element 19 via the gear wheel 20, whereby the actual length of the plunger assembly composed of the first, second and third elements 18, 19 and 21 is adjustable to provide a proper clearance for the final clamping of the mold halves, as described in detail in the specification of co-pending Patent application Ser. No. 192,275.

Figure 2:
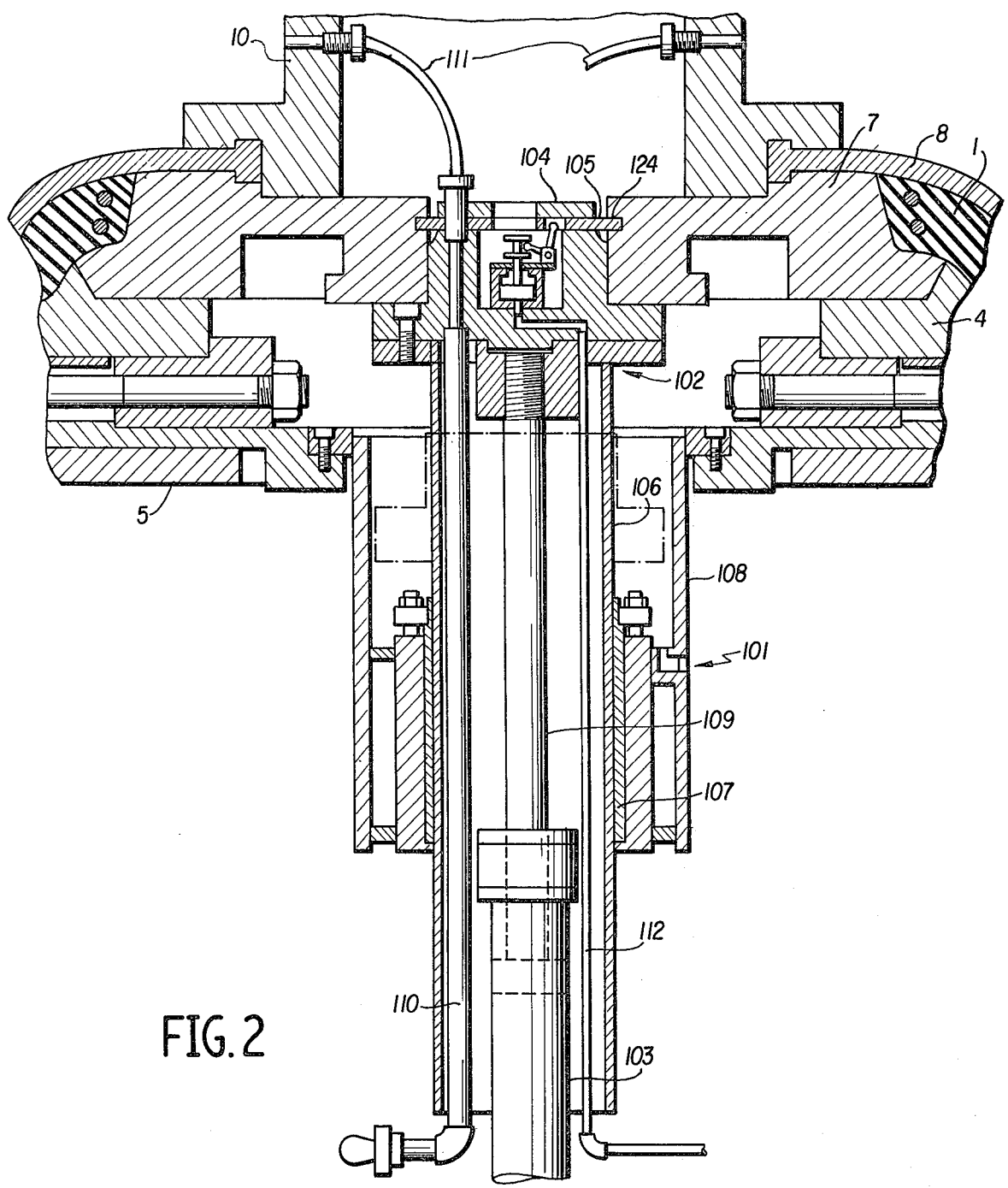
FIG. 2 is a vertical section of a part of the mechanical press equipped with the device according to this invention and especially showing an embodiment of the device according to this invention.

Now referring to FIG. 2, the press is shown as being equipped with the device for removing the cured tire from the curing mold which is constructed according to this invention.

The device for removing the cured tire 1 from the mold 2 is substantially composed of a columnar actuator generally indicated by the reference numeral 101 which includes an armature generally shown by reference numeral 102 being vertically movable by a cylinder-piston arrangement 103 of the double-action type, as will be described.

The armature 102 has a head block 104 in which are disposed a plurality of key members 105 and a driving mechanism for driving the key members which are described in detail hereinbelow. The head block 104 is carried by a cylindrical guide member 106, which is slidably received in a pressure sealing manner by a sealing member 107 of a coaxial cylindrical support 108 mounted below a bottom portion of the stand 5. The head block 104 is connected with a piston rod 109 of the cylinder-piston arrangement 103 and is driven thereby between its lowered position shown by dash-and-dot lines in FIG. 2 and its raised position a little above the position shown by solid lines in FIG. 2. Reference numeral 110 designates one of the internal pipes for supplying hot water to the bladder 8 through connecting pipes 111. The fluid for controlling the driving mechanism for the key members 105 is supplied through pipes 112.

Figure 3:
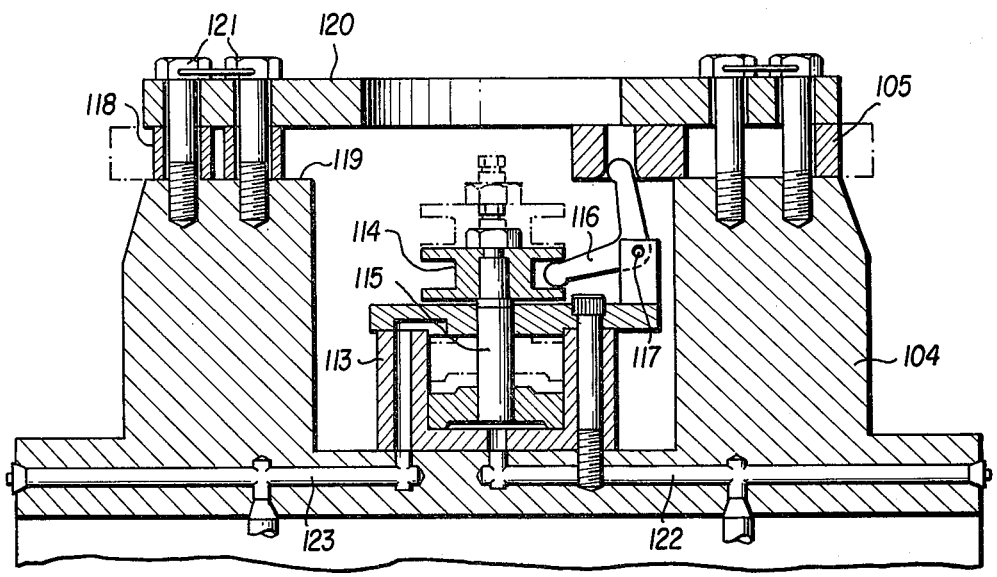
FIGS. 3 and 4 are a vertical section and a plan view, respectively, of the armature head portion of the device shown in FIG. 2.
Figure 4:
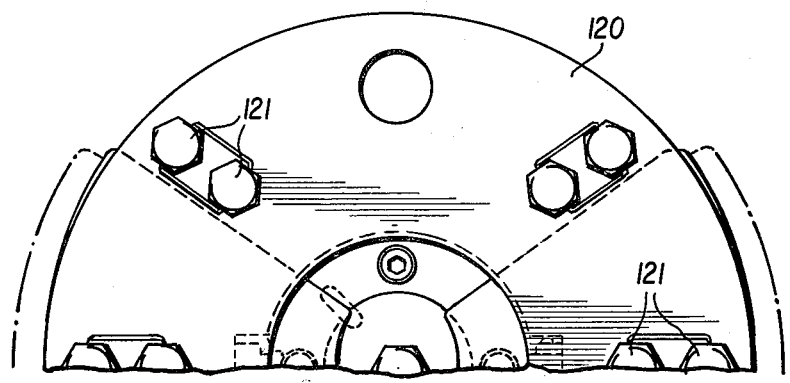

FIGS. 3 and 4 show the driving mechanism for the key members 105 in greater detail. This mechanism includes a cylinder-piston arrangement 113 of the double-action type disposed in the head block 104 and a spool member 114 carried by a piston rod 115 of the cylinder-piston arrangement 113. Engaged with the spool member 114 are an end of each of a number of right-angled levers 116 pivotally supported by pins 117 on the cylinder housing of the cylinder-piston arrangement 113. The other end of each of the levers 116 is engaged with a slot in one of the key members 105 so that when the spool 114 is moved between the positions shown by solid and dash-and-dot lines in FIG. 3 due to the actuation of the cylinder-piston arrangement 113, the key members 105 are moved between the retracted positions thereof shown by solid lines and the advanced positions thereof shown by dash-and-dot lines. The key members 105, which are sectoral members in this embodiment, are provided in a twin arrangement, as best shown in FIG. 4, and are slidably guided by sleeves 118 which maintain the necessary clearance between an end face 119 of the head block 104 and an end plate 120 clamped thereto by bolts 121. Reference numerals 122 and 123 designate conduits for the fluid which operates the cylinder-piston arrangement 113, wherein the conduit 122 is connected with the pipe 112, while the conduit 123 is connected with another pipe, not shown.

The device described herein with reference to FIGS. 2 and 4 operates in the following manner:

When the mold unit containing a "green" tire to be cured is charged onto the stand 5 and positioned at the center thereof, the armature head block 104 is kept at its lowered position shown by dash-and-dot lines in FIG. 2. Then, the head block is raised with the key members 105 being kept in their retracted positions until it engages the lower bead ring 7, as shown in FIG. 1. The cylinder-piston arrangement 113 is then actuated to advance the key members 105 so that the outer ends thereof move into corresponding notches 124 of the bead ring 7. After the connecting pipes 111 have been set, the mold is pressed and confined in a heating steam atmosphere, and the tire is subjected to the long curing process. In this case, it is to be noted that the upper mold half 3 is firmly connected with the plunger element 21 by bolts 125 and the lower mold half 4 is firmly connected with the stand 5 by bolts 126 prior to applying the steam atmosphere.

When the curing process has been completed, the plunger assembly is lifted by the crank gear while holding the armature 102 firmly at the position shown in FIG. 2 by the cylinder-piston arrangement 106. Now, since the upper mold half 3 is firmly connected with the plunger element 21 by bolts 25 on the one hand, and the tire 1 is firmly held by the armature 102 on the other hand through its locking engagement with the bead ring 7, the upper mold half 3 is forcibly removed from the tire by overcoming the relatively high binding force existing therebetween.

The cylinder-piston arrangement 103 is operated to lift the armature 102 above the position shown in FIG. 2, whereby the bead ring 7 and the tire 1 secured thereto are driven upward by the armature 102. However, since the lower mold half 4 is firmly connected with the stand 5 by bolts 126, the tire is forcibly removed from the lower mold half 4 by overcoming the relatively high binding force existing therebetween. Thus, the tire 1 has been completely removed from the mold. Thereafter, it is only necessary to actuate the cylinder-piston arrangement 113 to withdraw the key members 105 from engagement with the bead ring 7 and to disconnect the pipes 111 before taking the tire out of the press.

From the foregoing, it will be appreciated that by employing the device embodied by this invention, tire manufacturers are relieved of the conventional heavy, difficult and expensive labor involved in removing heavily binding tires from the curing molds, the curing process can be highly automated, and the speed of the curing process is very much improved.

Obviously many modifications and variations of the present invention are possible in light of these teachings. It is to be understood, therefore, that within the scope of the appended claims, the invention may be practiced otherwise than as specifically described herein.

What is claimed as new and desired to be secured by letters patent of the United States is:

1. In a device for removing a cured tire from a mold in which the tire has been cured and in which bead portions of a semi-shaped and not yet cured tire are confined by upper and lower bead rings, and a bladder is placed in contact with the inside surface of the tire, the inside peripheries of said bladder being fluid-tightly closed by a cylindrical packing means comprised of mutually engaged bladder rings which in turn are engaged with the upper and lower bead rings before the tire is placed in the mold, the improvement comprising:
   a columnar actuator having an armature movable along the axis thereof and being mounted in a curing equipment in axial alignment with said mold;
   means for moving said armature;
   said lower one of said bead rings having at least one notch formed on the inner peripheral surface thereof;
   latching means carried by said armature for selectively engaging said at least one notch of said lower one of said bead rings secured to the tire contained in said mold; and
   means for actuating said latching means whereby said latching means may be engaged with said lower one of said bead rings to permit said actuator to move said lower one of said bead rings and said cured tire secured thereto away from said mold.

2. A device according to claim 1, wherein said armature has a cylindrical guide member sealingly received in said columnar actuator and said means for moving said armature are disposed in said cylindrical guide member.

3. A device according to claim 2, wherein said means for moving said armature is a piston-cylinder means of the double-action type.

4. A device according to 7, wherein said latching means comprises:
   a spool member carried by said means for actuating said latching means;
   a plurality of key members movable in said armature radially of the axis of movement of said armature for engaging said notch of said lower bead ring; and
   a plurality of levers connecting said spool member and said plurality of key members for changing the direction of force of said actuator means by right angles to effect movement of said key members.

5. A device according to claim 4, wherein said means for actuating said latching means comprises a piston-cylinder means in said armature, and said spool member is carried on a piston rod of said piston-cylinder means.

6. A device according to claim 5, wherein said piston-cylinder means is of the double-action type.

* * * * *